Sept. 17, 1963 E. N. HALVERSON ET AL 3,103,700
PELLETIZING APPARATUS WITH A TANGENTIAL FLOW ENTRY
Filed March 13, 1961 2 Sheets-Sheet 1

INVENTORS
ERNEST NORMAN HALVERSON
FRANK PERCIVAL CHARLES COKER
By:
AGENT

INVENTORS
ERNEST NORMAN HALVERSON
FRANK PERCIVAL CHARLES COKER
BY
AGENT

3,103,700
PELLETIZING APPARATUS WITH A TANGENTIAL FLOW ENTRY
Ernest Norman Halverson, Edmonton, Alberta, Canada, and Frank Percival Charles Coker, Knutsford, England, assignors to Canadian Industries Limited, Montreal, Quebec, Canada, a corporation of Canada, and Imperial Chemical Industries Limited, London, England, a corporation of Great Britain
Filed Mar. 13, 1961, Ser. No. 95,430
Claims priority, application Great Britain Mar. 17, 1960
1 Claim. (Cl. 18—12)

This invention relates to an apparatus for extruding thermoplastic materials and cutting them into pellets.

In British Patent No. 774,681 is claimed a process for converting a thermoplastic polymeric material into a uniform, free-flowing granular form that comprises extruding the molten material through one or more thread- or rod-forming orifices directly into a body of cooling liquid, and cutting the extruded material transversely into fragments while it is immersed in the liquid and before it has cooled throughout to the solid state. It is stated to be preferred to cut the material immediately against the extrusion orifice by means of cutter knives that are in contact with the die face. The method and apparatus are particularly useful for forming pellets of polythene.

In British Patent No. 829,152 is described apparatus for operating a process of this type, in which the extrusion die is a hollow, substantially frusto conical member provided with a plurality of die orifices on its internal face and containing within it a revolving cutter which cuts the extruded material into pellets. By this apparatus the thermoplastic material may be cut cleanly and efficiently with the knives out of contact with the die face, and this allows the die and cutter to be more lightly constructed than flat faced dies to provide adequate strength and resistance to distortion. This apparatus had the further advantage that, because of the frusto-conical shape of the die, the clearance between the knives and the die face could readily be adjusted by movement of the cutter along its axis of revolution.

We have now found, however, that the accuracy of construction of the die and its uniformity of action can be greatly increased by constructing the extrusion die in the form of a hollow cylinder having the die orifices on its internal face.

In accordance with the present invention, therefore, an apparatus for forming pellets of thermoplastic material comprises a hollow, circular, cylindrical die, said die being provided on its internal face with a plurality of extrusion orifices spaced around its periphery; at least one knife located within said die adapted to revolve along a path parallel to the internal die face; means for supporting and revolving said knife; means adapted to forward molten thermoplastic material to said extrusion orifices under sufficient pressure to extrude it therethrough; and means for forwarding a fluid to the open internal core of said die and conducting it therethrough for the purpose of cooling the extruded thermoplastic material and conveying the cut material away immediately after it has been cut by the knife or knives.

The molten thermoplastic material is preferably forwarded to a continuous, circular extrusion channel surrounding the cylindrical die and thence to the extrusion orifices. In accordance with a further feature of our invention, this extrusion channel is preferably provided with a tangential entry for the thermoplastic material. Such an arrangement avoids uneven distribution of the thermoplastic material and physical distortion arising from temperature stresses.

To reduce wear on the knives, it is preferred to allow a small clearance between the path of the cutting edge and the die face; this can be done quite satisfactorily if the thermoplastic material gives a viscous melt, as, for example, in the case of polythene. For thin melts, however, it may be found necessary to run the cutter with the cutting edges of the knives in light contact with the die face.

Apart from the different shape of the die, the preferred tangential entry of the thermoplastic material, and the fact that the clearance between the knives and the die face cannot be adjusted by moving the cutter along its axis of revolution, the apparatus may in general be constructed and operated similarly to the apparatus particularly described in British Patent No. 829,152.

In order that our invention may be more clearly understood reference will now be made to the accompanying drawings, in which is shown, diagrammatically, a particular apparatus constructed in accordance with this invention.

Figure 1:
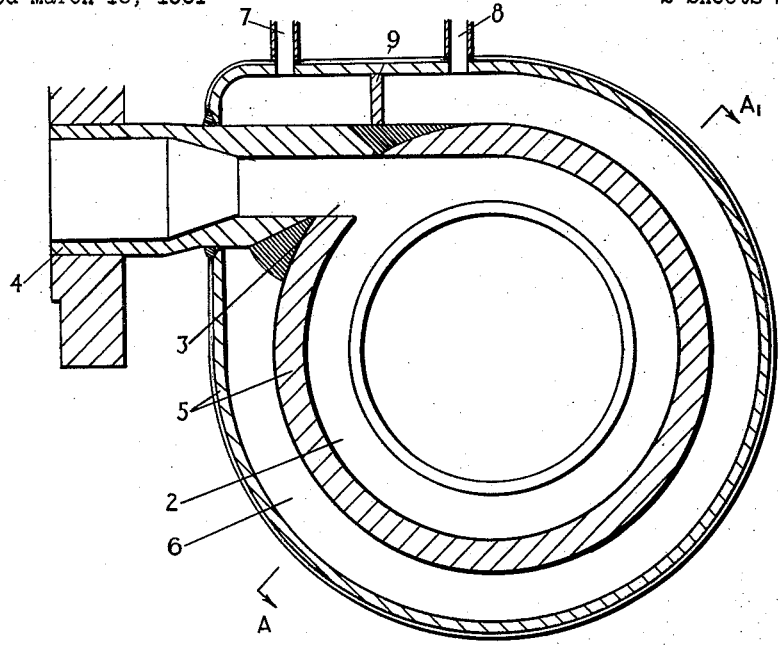
FIGURE 1 is a transverse sectional diagram through the extrusion head which is adapted to surround the cylindrical die.

In FIGURE 1: 2 represents the extrusion channel which will surround the die and which receives molten thermoplastic material through the tangential entry 3 from an extruder 4. 5 represents the outer shell of the extrusion head, which contains a steam heating channel 6 provided with an inlet 7, an outlet 8, and baffle 9.

Figure 2:
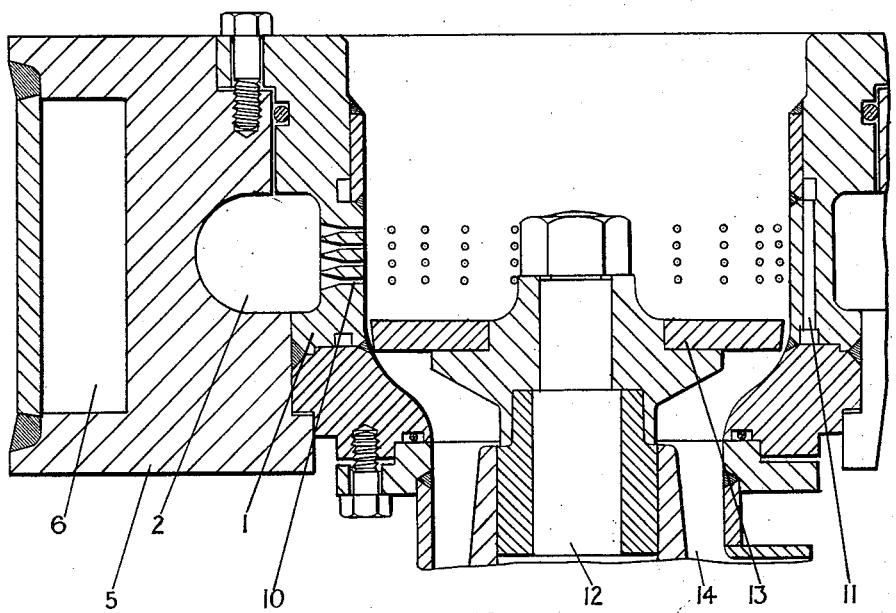
FIGURE 2 is a partial cut-away sectional diagram through A—A' of FIGURE 1, but including the die and the cutter shaft and head for carrying the knives (not shown)

FIGURE 2, in addition to components numbered as in FIGURE 1, shows: the cylindrical die 1; the extrusion orifices 10, arranged in vertical lines evenly spaced around the cylindrical die; a steam channel 11, which lies between the two rows of orifices and is part of a network of channels for heating the cylindrical die; and the revolving cutter including a shaft 12 and cutter head 13 for carrying the knives (not shown). The shaft 12 is surrounded by a pipe 14 for conducting cooling water to the bowl of the die; an outlet collar is provided at the top of the bowl as described in British Patent No. 829,152.

Figure 3:
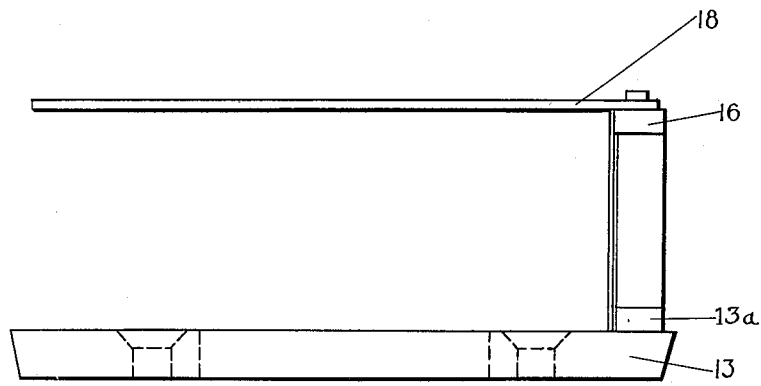
FIGURE 3 is a sectional view of the cutter head with knife pillar and supporting ring.
Figure 4:
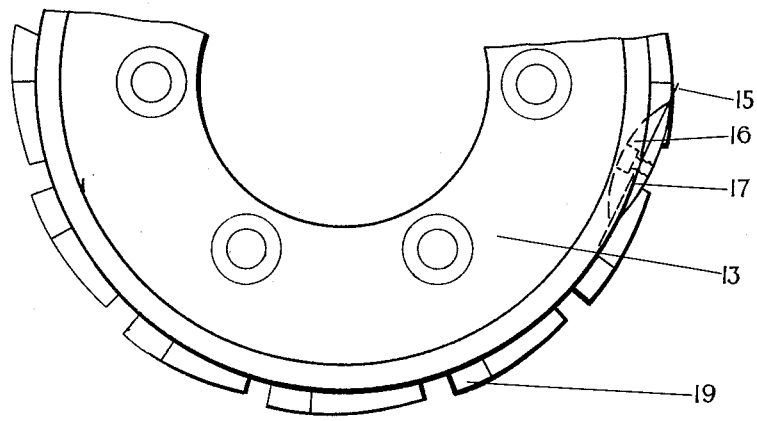
FIGURE 4 is a plan view of the cutter head, showing one of the knives.

In FIGURES 3 and 4, 13 is the cutter head, 13a denotes the vertical blade supports for six regularly spaced fixed or movable blades (one shown at 15), the blades being sandwiched between a holder 16 and a clamping plate 17. All the supports are rigidly connected and located by ring plate 18 which prevents distortion of the supports that might be caused by centrifugal or hydrodynamic forces. 19 are vanes attached to the cutter head, having their leading edges downwardly directed, between which water currents pass upwards towards the cutting region.

It will be appreciated that many modifications may be made to the apparatus particularly described without departing from the scope of our invention. For example, instead of the fixed blades shown in FIGURES 3 and 4, swinging, self-adjusting blades may be provided on the cutter head. However, fixed blades can be used quite satisfactorily particularly when, in normal use, they are out of contact with the die face, and do not rapidly wear. While it is preferred to provide at least two knives to balance the cutting apparatus, and particularly three or more knives, in the manner shown in FIGURES 3 and 4, to give a balanced, robust cutting unit, it is possible to use a cutting head with only one knife. The steam heating system of the die usually eliminates the need to provide insulation between the cooling water and the thermoplastic material in the extrusion channel. However, insulation such as that described in British Patent No. 829,152 may be used instead of steam heating. A heating medium other than steam may be used both for the die and for the extrusion channel.

If desired, the rate of revolution of the cutter may be controlled by an instrument circuit in accordance with the screw speed of the extruder, so that the size of the cut pellets remains constant with variations in the rate of output.

The apparatus of the invention combines the advantages of providing a means by which a high output of pelleted material can be obtained from apparatus of relatively light construction, of being capable of accurate and symmetrical construction to close tolerances and of remaining free from distortion during prolonged use. The tangential supply of thermoplastic material provides exceptionally even distribution of the material through all the orifices round the cylindrical die. Another detail of design that provides an advantage is the arrangement of the orifices in vertical lines; this makes the layout and fabrication of steam passages through the cylindrical die very much easier.

As with the apparatus of British Patent No. 829,152, water will generally be used for cooling and conveying the cut pellets, and this may be circulated through a heat exchanger and fed back to the inlet at a predetermined temperature. The water advantageously contains a corrosion inhibitor.

It is preferred to include a means to ensure that the pellets, which have been cut in the molten state, do not stick together but, on the other hand, do not cool to such an extent that drying becomes difficult after they have been mechanically separated from the water. In one method of ensuring the rapid separation and removal of the pellets, the cutter unit is provided with a set of stationary vanes which project into the space within the cutter and arrest the swirl of water and entrained particles. These vanes are attached to a system of ducting of such dimensions that the dwell time of particles in water becomes an optimum before separation and drying takes place.

It will be evident that water temperature and flow rate, thermoplastic material temperature and pressure, steam temperature and pressure, the cutter speed and the clearance between the knives and the die face are all factors affecting the operation of the apparatus and the size, shape and surface characteristics, particularly the gloss, of the pellets produced. For polythene, the clearance between the cutting edges of the knives and the die face is preferably about 0.001 inch, and the temperature of the cooling water is preferably maintained at from 60° C. to 70° C.

We claim:

In an apparatus for forming pellets of thermoplastic material comprising a hollow, circular, cylindrical die, said die being provided with a plurality of extrusion orifices spaced around its periphery; an extrusion die channel surrounding said die and adapted to receive molten thermoplastic material; at least one knife located within and separated from said die and adapted to revolve parallel to the internal die face; means for supporting and revolving said knife; means adapted to forward molten thermoplastic material at extrusion pressures, through said extrusion orifices; and means for forwarding a fluid to the open internal core of said dies and conducting it therethrough for the purpose of cooling the extruded thermoplastic material and conveying it away immediately after it has been cut; the improvement which comprises a tangential entry for the thermoplastic material to said extrusion channel.

References Cited in the file of this patent

UNITED STATES PATENTS

| | | |
|---|---|---|
| 1,768,008 | Sizer | June 24, 1930 |
| 2,186,415 | Haworth | Jan. 9, 1940 |
| 2,614,290 | Street | Oct. 21, 1952 |
| 2,642,819 | Birdsall | June 23, 1953 |
| 2,775,788 | Andrew | Jan. 1, 1957 |
| 2,850,764 | Evans et al. | Sept. 9, 1958 |
| 2,862,243 | Farr et al. | Dec. 2, 1958 |